United States Patent [19]

Cesarz et al.

[11] 4,292,577

[45] Sep. 29, 1981

[54] A.C. MOTOR CONTROL CIRCUIT

[75] Inventors: Michael R. Cesarz, Mequon; Richard E. Stobbe, Greenfield, both of Wis.

[73] Assignee: Kearney & Trecker Corporation, West Allis, Wis.

[21] Appl. No.: 19,936

[22] Filed: Mar. 12, 1979

[51] Int. Cl.³ .......................... H02P 5/28; H02P 5/34
[52] U.S. Cl. .................................. 318/802; 318/723; 318/799; 318/807; 318/811
[58] Field of Search ............... 318/798, 799, 800, 801, 318/802, 803, 807, 810, 811, 812, 720, 721, 722, 723, 724

[56] References Cited

U.S. PATENT DOCUMENTS

| | | | |
|---|---|---|---|
| 3,585,488 | 6/1971 | Gutt et al. | 318/811 X |
| 3,819,992 | 5/1974 | Opal et al. | 318/798 |
| 3,854,078 | 12/1974 | Hubner | 318/721 |
| 3,863,120 | 1/1975 | Rettig | 318/721 X |
| 3,878,445 | 4/1975 | Kirkham et al. | 318/308 |
| 3,886,431 | 5/1975 | Meier | 318/807 X |
| 3,896,356 | 7/1975 | Hoffman et al. | 318/802 |
| 3,967,173 | 6/1976 | Stich | 318/811 |
| 4,042,862 | 8/1977 | Franklin | 318/800 |
| 4,088,932 | 5/1978 | Okayama et al. | 318/721 X |
| 4,123,692 | 10/1978 | Gilmore et al. | 318/811 X |
| 4,230,979 | 10/1980 | Espelage et al. | 318/721 |

FOREIGN PATENT DOCUMENTS 2115172 12/1971 Fed. Rep. of Germany ...... 318/811

Primary Examiner—J. V. Truhe
Assistant Examiner—Richard M. Moose
Attorney, Agent, or Firm—Cyril M. Hajewski; Robert B. Levy

[57] ABSTRACT

A tachometer is coupled to the rotor of an A.C. motor and generates an output voltage proportional to the rotor's speed. A VELOCITY COMMAND voltage is generated having an amplitude which specifies a desired rotor speed. The tachometer voltage is subtracted from the VELOCITY COMMAND voltage to produce a VELOCITY ERROR voltage. The output of a D.C. power source is chopped at a fixed frequency and variable pulse width, the pulse width being proportional at any time to the amplitude of the VELOCITY ERROR voltage. The chopped D.C. voltage is filtered to provide a variable D.C. voltage having an amplitude which is proportional to the amplitude of the VELOCITY ERROR voltage. The variable D.C. voltage is applied to an inverter which changes it into an A.C. voltage. The A.C. voltage is applied to the stator windings of the motor to drive the rotor thereof. The frequency of the A.C. voltage is variable and is proportional, at rotor speeds above 150 RPM, to the amplitude of the velocity command voltage. At rotor speeds below 150 RPM, the frequency of the A.C. voltage is held fixed at approximately 28 Hz. The amplitude of the A.C. voltage is proportional to the VELOCITY ERROR voltage at all speeds. The frequency of the A.C. voltage is determined by an oscillator which drives a ring counter whose counting direction is controlled by a direction flip-flop. The state of the direction flip-flop is changed whenever the polarity of the VELOCITY ERROR voltage changes so that deceleration of the motor always occurs in a plugging mode.

16 Claims, 13 Drawing Figures

A.C. MOTOR CONTROL CIRCUIT

BACKGROUND OF THE INVENTION

This invention relates to A.C. motor control circuits in which both the amplitude and the frequency of the stator winding voltage of an A.C. motor are varied to vary the rotor speed thereof. One circuit of this type is disclosed in U.S. Pat. No. 3,878,445 which was issued to Edward E. Kirkham et al on Apr. 15, 1975 for an "A.C. MOTOR CONTROL APPARATUS AND METHOD".

In the Kirkham et al patent, an A.C. power supply voltage is rectified by a silicon controlled rectifier circuit whose D.C. output amplitude can be varied by varying the firing angle of the silicon controlled rectifiers. The D.C. output of the silicon controlled rectifier circuit is applied to an inverter which changes the D.C. voltage into an A.C. voltage. The frequency of the A.C. voltage can be varied by varying the frequency of an oscillator in the inverter circuit. The A.C. voltage is applied to the stator windings of an A.C. motor to drive the rotor thereof. Both the frequency and the amplitude of the A.C. voltage are selected in accordance with predetermined algorithms to produce the desired rotor speed and torque.

A pulse generator is coupled to the rotor of the A.C. motor and produces pulses whose frequency is proportional to the speed of the rotor. The pulse generator is coupled to a counter which is periodically interrogated to measure the actual speed and position of the rotor. The actual speed of the rotor is compared in a computer to the commanded speed thereof and an error signal is generated which indicates the difference between the actual speed of the rotor and the commanded speed thereof. The firing angle of the silicon controlled rectifiers is controlled to produce a D.C. output voltage which is related to the magnitude of the error signal by an empirically derived algorithm.

SUMMARY OF THE INVENTION

A tachometer is coupled to the rotor of an A.C. motor and produces an output voltage proportional to the speed of the rotor. The output of the tachometer is compared to a VELOCITY COMMAND voltage having an amplitude which signifies a desired rotor speed. The difference between the tachometer voltage and VELOCITY COMMAND voltage constitutes a VELOCITY ERROR voltage. The output of a D.C. power source is chopped at a fixed frequency and variable pulse width, the pulse width being proportional at any time to the amplitude of the VELOCITY ERROR voltage. The chopped D.C. voltage is filtered to provide a variable D.C. voltage which is proportional at any time to the amplitude of the VELOCITY ERROR voltage. the variable D.C. voltage is applied to an inverter which changes it into an A.C. voltage. The A.C. voltage is applied to the stator windings of the motor to drive the rotor thereof. The frequency of the A.C. voltage is variable and is controlled to have a predetermined relationship to the VELOCITY COMMAND voltage.

In the preferred embodiment, the frequency of the A.C. voltage is determined by an oscillator which drives a ring counter whose counting direction is reversed whenever the polarity of the VELOCITY ERROR signal changes so that deceleration of the motor always occurs in a plugging mode. Also, in the preferred embodiment, the frequency of the A.C. voltage with respect to rotor speed is held above a minimum level below a predetermined rotor speed and varies in direct proportion to the VELOCITY COMMAND voltage above the predetermined rotor speed.

DESCRIPTION OF THE PREFERRED EMBODIMENTS

Figure 1:
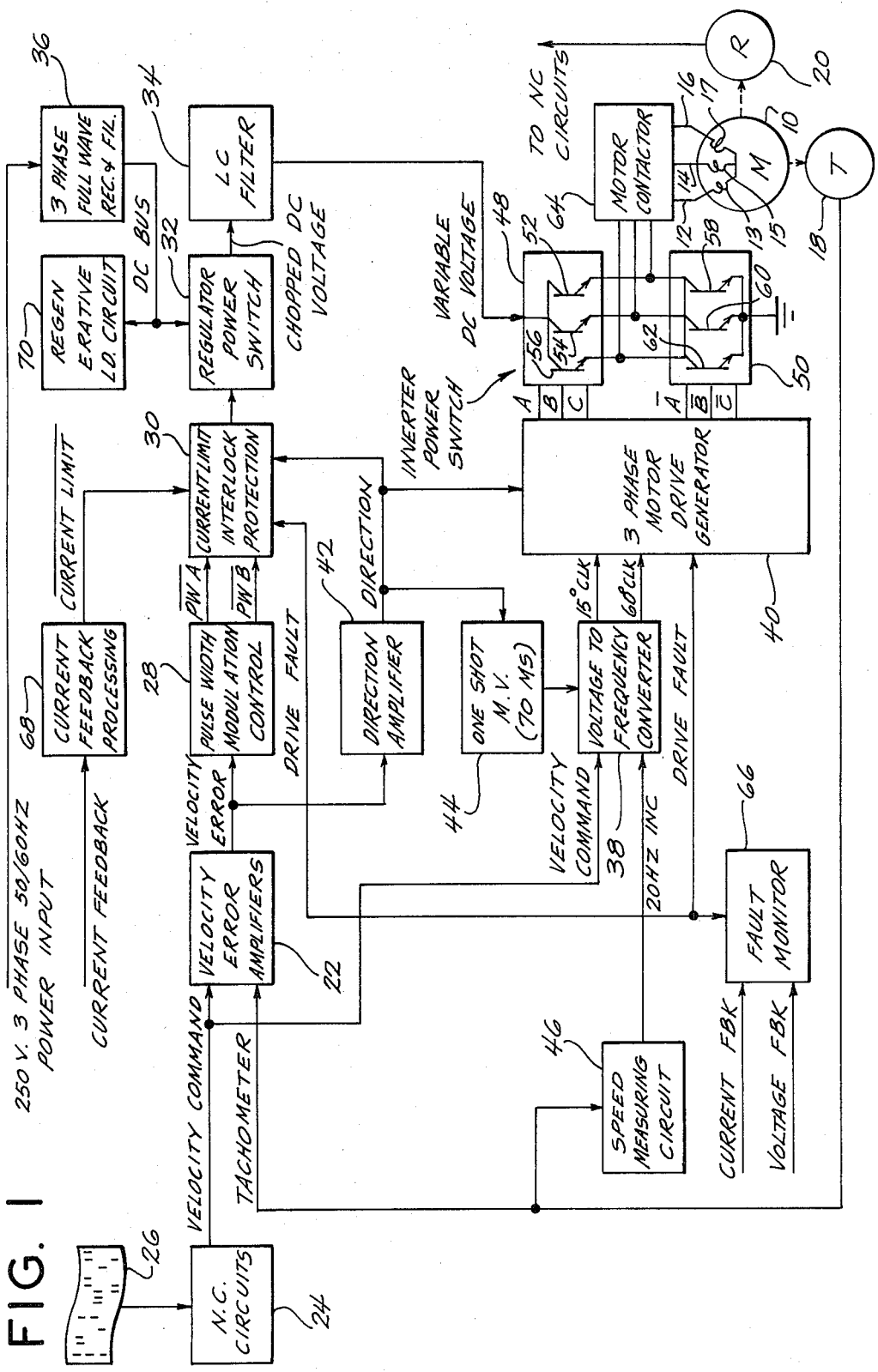
FIG. 1 is a general block diagram of one preferred embodiment of the invention.

FIG. 1 is a general block diagram of one preferred embodiment of the invention. Referring to FIG. 1, a 3-phase induction motor 10 has three input leads 12, 14 and 16 for the stator windings 13, 15 and 17 thereof and has a rotor (not shown) which is mechanically coupled to a tachometer 18 and a resolver 20. Resolver 20 produces an A.C. output signal whose phase angle represents the position of the rotor at any time, the tachometer 18 produces a D.C. voltage whose amplitude is proportional at any time to the instantaneous speed of the rotor. The polarity of the tachometer output depends on the rotors direction of rotation. The output of tachometer 18 is coupled to Velocity Error Amplifiers 22 where it is subtracted from a VELOCITY COMMAND voltage generated in conventional numerical control circuits 24.

Numerical control circuits 24 receive a spindle velocity command, which is in the form of a binary number on a punched tape 26, and converts the binary velocity command number to an analog VELOCITY COMMAND voltage having an amplitude that represents the desired speed for the rotor of motor 10. The polarity of the VELOCITY COMMAND voltage indicates the desired direction of rotation. The difference between the tachometer output voltage and the VELOCITY COMMAND voltage is a VELOCITY ERROR voltage whose amplitude is proportional to the difference between the commanded rotor speed and the actual rotor speed. The polarity of the error voltage indicates whether the actual speed is greater or less than the commanded speed.

Resolver 20 can be used in place of tachometer 18 in embodiments where resolver 20 is sampled in equal time intervals in which case, the resolver output indicates both velocity and position.

In this invention, the amplitude of the 3-phase A.C. voltage applied to the stator windings of motor 10 is varied in direct proportion to the amplitude of the VELOCITY ERROR voltage output of Velocity Error Amplifiers 22. This is done by deriving the 3-phase A.C. voltage from a variable D.C. voltage in an inverter circuit and varying the D.C. voltage in accordance with the amplitude of the VELOCITY ERROR voltage. The D.C. voltage is varied by a pulse width modulation circuit which produces a train of D.C. pulses having a substantially fixed frequency and having a variable pulse width which is proportional at any time to the amplitude of the VELOCITY ERROR voltage. This pulse train is filtered to provide the variable D.C. voltage which is applied to the inverter circuit.

The pulse width modulation circuit includes a Pulse Width Modulation Control Circuit 28, a Current Limit and Interlock Protection Circuit 30, a Regulator Power Switch Circuit 32 and an LC Filter Circuit 34.

Figure 13:
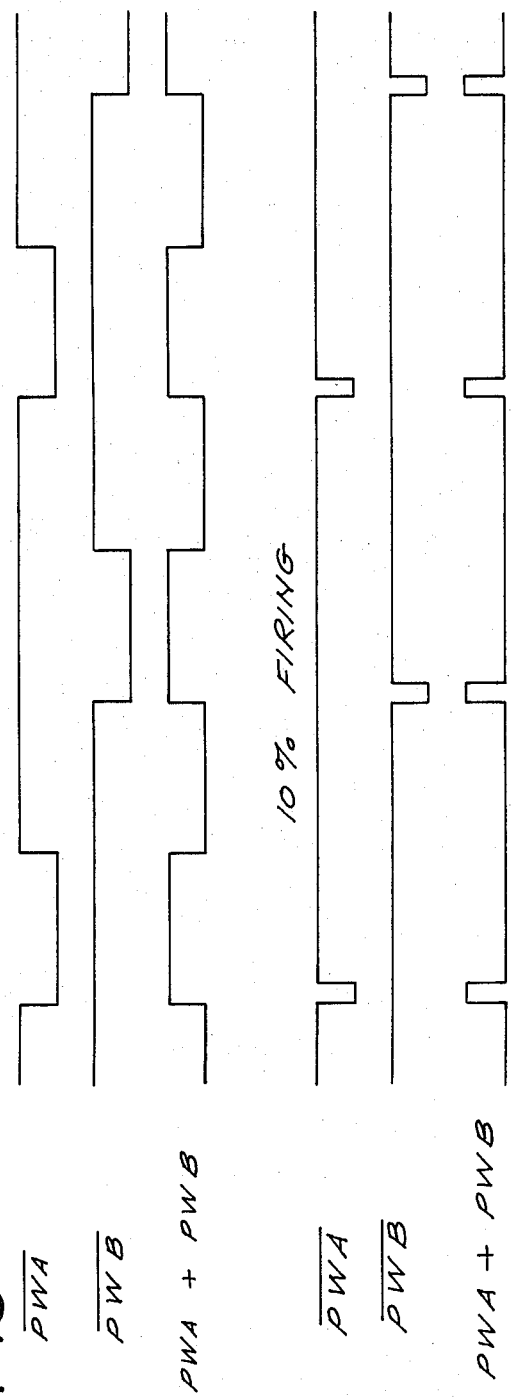
FIG. 13 is a set of waveforms illustrating the operation of the pulse width modulation circuit of FIG. 1.

The output voltages $\overline{PWA}$ and $\overline{PWB}$ of Pulse Width Modulation Control Circuit 28 are shown in FIG. 13 for two illustrative conditions (50% firing and 10% firing). The pulses shown in FIG. 13 are produced in a continuous train at a fixed frequency and have a variable pulse width which is proportional to the VELOCITY ERROR output of Velocity Error Amplifiers 22.

Current Limit and Interlock Protection Circuit 30 passes the pulse train output of Pulse Width Modulation Control Circuit 28 under normal conditions and blocks the pulse train in the event that an over-current, over-voltage or under-voltage condition arises.

In Regulator Power Switch 32, a regulated D.C. voltage derived from a Rectifier and Filter Circuit 36 is chopped by the pulse train output of Current Limit and Interlock Protection Circuit 30. The output of Regulator Power Switch 32 is filtered by an LC Filter Circuit 34 to produce a D.C. voltage having an amplitude which is proportioned to the magnitude of the VELOCITY ERROR output of Velocity Error Amplifiers 22. The output of LC Filter Circuit 34 is applied to an inverter circuit described below, which changes the D.C. voltage into an A.C. voltage.

The inverter circuit includes a Voltage to Frequency Converter Circuit 38 which produces a pulse train output having a frequency which is proportional to a D.C. input voltage (VELOCITY COMMAND). Voltage to Frequency Converter Circuit 38 has two output frequencies, a first frequency (15° CLOCK) and a second frequency (60° CLOCK), which is ¼ the frequency of the first frequency. The 15° and 60° designations relate to phase angles on a 3-phase square waveform which is produced in Three Phase Motor Drive Generator 40.

Figure 11:
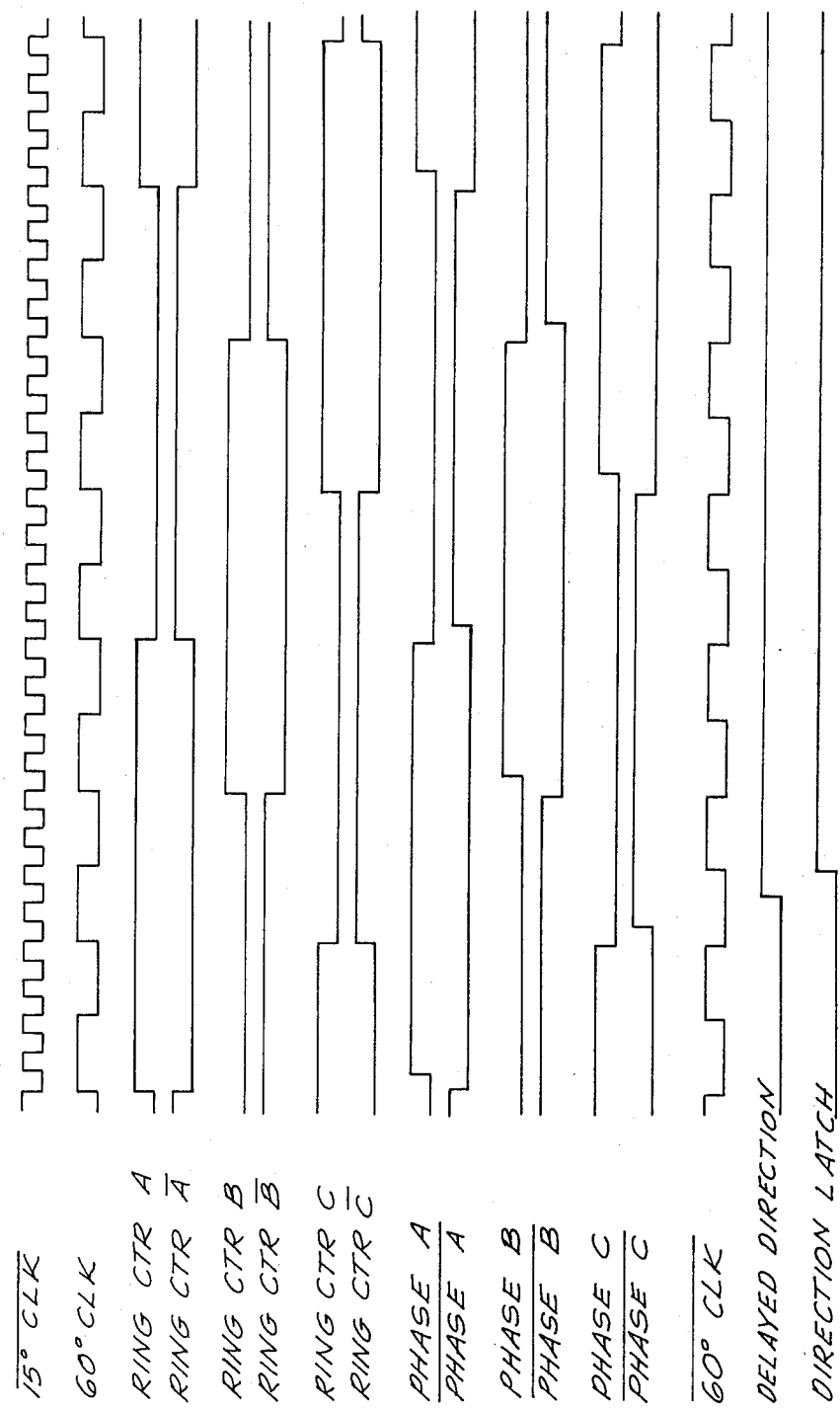
FIG. 11 is a set of waveforms illustrating the operation of the inverter which drives the motor of FIG. 1.

The 3-phase output of Three Phase Motor Drive Generator 40 shown in FIG. 11 and is reversible in response to the polarity of a DIRECTION signal which is derived from the VELOCITY ERROR signal by a Direction Amplifier 42. The DIRECTION signal also coupled to a One-Shot Multivibrator 44 which applies a 70 m.s. fixed voltage pulse to Voltage to Frequency Converter Circuit 38 to raise the frequency of the outputs thereof when the polarity of the DIRECTION signal changes.

The output frequency of Voltage to Frequency Converter Circuit 38 is held above a predetermined minimum value at motor speeds below 150 RPM by a Speed Measuring Circuit 46 which receives an input from tachometer 18 and produces a D.C. output signal (20 Hz INCREASE) which is high below 150 RPM and low above 150 RPM. At motor speeds above 150 RPM, the output frequency of Voltage to Frequency Converter Circuit 38 is proportional to the VELOCITY COMMAND input to Velocity Error Amplifiers 22.

The 3-phase square wave output of Three Phase Motor Drive Generator 40 is applied to the input of Power Switching Circuits 48 and 50 and controls the base voltage of power transistors 52 through 62 which control the input to the stator windings of motor 10 through Motor Contactor 64 and input leads 12, and 16.

A Fault Monitor Circuit 66 receives VOLTAGE FEEDBACK and CURRENT FEEDBACK signals and produces a binary output (DRIVE FAULT) which goes high when an over-current, over-voltage or under-voltage condition arises. The DRIVE FAULT signal is applied to Three Phase Motor Drive Generator 40 and Current Limit and Interlock Protection Circuit 30. An over-current condition is also sensed by a Current Feedback Processing Circuit 68 and generates a $\overline{CURRENT\ LIMIT}$ signal which is applied to Current Limit and Interlock Protection Circuit 30 as a second form of over-current protection.

A Regenerative Load Circuit 70 is coupled to Rectifier Circuit 36 to absorb transient over-voltage conditions due to motor regeneration.

PULSE WIDTH MODULATION CIRCUITS

In describing the foregoing circuits in greater detail, we will first describe the circuits involved in the pulse width modulation process. The Velocity Error Amplifiers 22 need no further description since they are old and well-known. Pulse Width Modulation Control Circuits 28 are shown in detail in FIG. 2.

Figure 2:
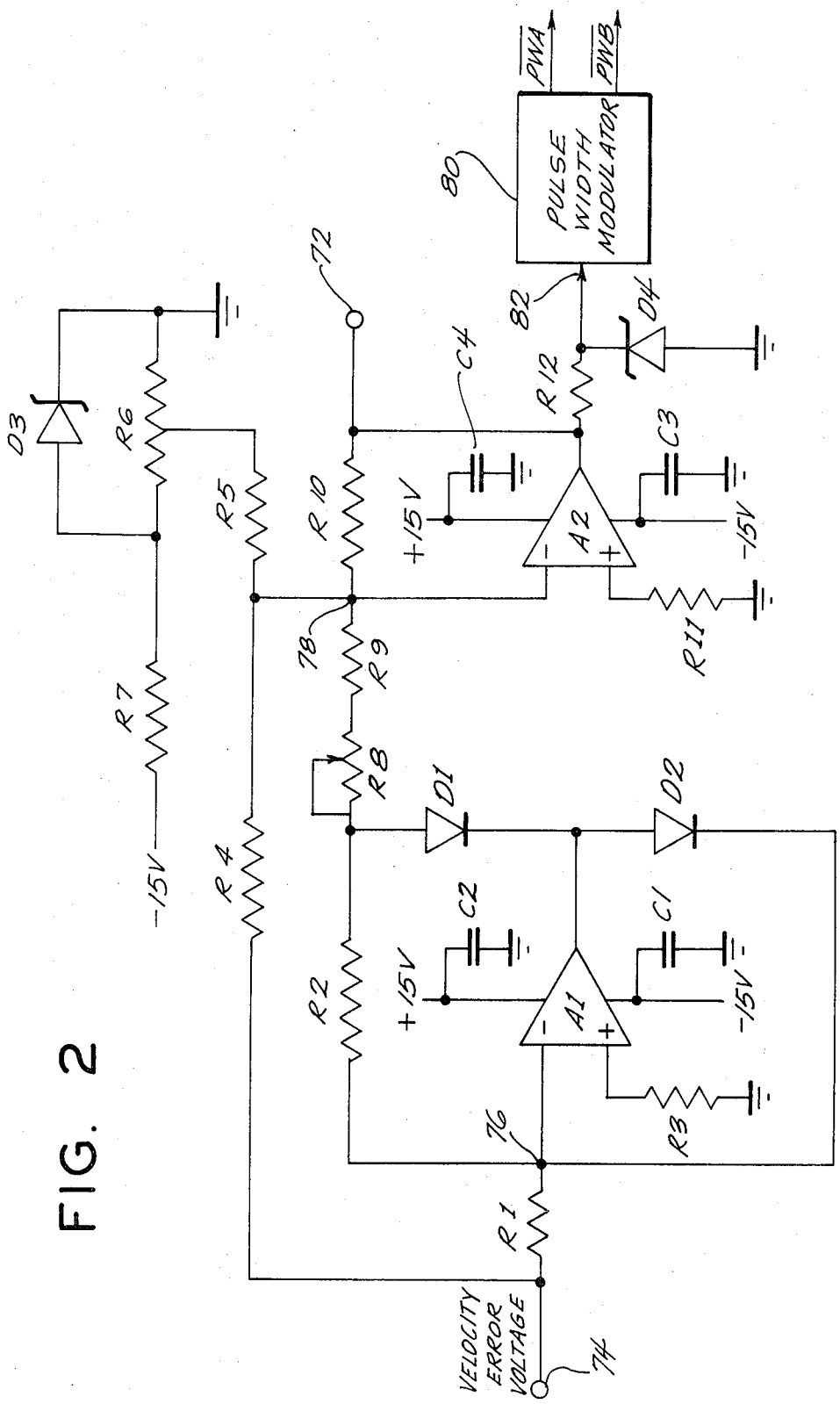
FIG. 2 is a schematic circuit diagram of one illustrative circuit for the pulse width modulation control of FIG. 1.

Referring to FIG. 2, two operational amplifiers A1 and A2 are connected in such a way as to form an absolute value amplifier in which the output voltage at terminal 72 is equal to an amplification factor K multiplied by the absolute value of the D.C. input voltage at terminal 74. The D.C. input voltage at terminal 74 is the VELOCITY ERROR voltage output of Velocity Error Amplifiers 22.

Resistors R1, R2 and R3 are selected in accordance with well-known prior art formulas to provide unity gain for operational amplifier A1. Diodes D1 and D2 are clamping diodes whose function is described in later paragraphs. Capacitors C1 and C2 are filter capacitors.

The input to operational amplifier A2 is a multi-branch resistor network which includes resistors R1, R2, R8 and R9 in one branch; resistor R4 in a second branch; and, resistors R5, R6 and R7 in a third branch.

The combined resistance of this resistor network can be calculated in accordance with well-known prior art formulas and is selected, along with the values of R10 and R11, to give the desired gain for operational amplifier A2 as described hereinafter. Potentiometer R8 varies the input resistance of operational amplifier A2 for one branch of the above-noted multi-branch input network. Resistors R5, R6 and R7, along with Zener diode D3, provide a variable negative bias voltage for the input of operational amplifier A2. Capacitors C3 and C4 are filter capacitors.

The operation of the circuit in FIG. 2 for negative values of VELOCITY ERROR voltage is as follows: The negative input to unity gain inverting amplifier A1 produces a positive output voltage which forward biases diode D2 and reverse biases diode D1; diode D2 provides feedback current to the summing junction 76; and diode D1 blocks current input to resistor R8. At the same time, the negative VELOCITY ERROR voltage is applied via resistor R4 to the input of operational amplifier A2, which will produce a positive output voltage at terminal 72. Amplifier A2 is scaled such that −8.0 VDC input at input terminal 74 will provide +2.5 VDC at output terminal 72.

A positive VELOCITY ERROR voltage at input terminal 74 produces a negative output of amplifier A1 which forward biases diode D1 and reverse biases diode D2. This provides input current to resistor R8. Resistors R8 and R9 are selected with respect to resistor R10 so that +8.0 VDC at input terminal 74 will produce approximately +5.0 VDC at output terminal 72. At the same time, the positive VELOCITY ERROR voltage applied through R4 is being summed at terminal 78 to provide approximately −2.5 VDC at output terminal 72 for +8.0 VDC at input terminal 74. The net result is +2.5 VDC present at output terminal 72 for +8.0 VDC at input terminal 74. Thus, either +8.0 VDC or −8.0 VDC at input terminal 74 produces approximately +2.5 VDC at output terminal 72.

The output voltage of operational amplifier A2 is applied through resistor R12 to a Conventional Pulse Width Modulator 80 which may, for example, be a Texas Instrument SG 3524 pulse width modulator. The input to Pulse Width Modulator 80 is limited by Zener diode D4. The output of Pulse Width Modulator 80 is a pair of periodic pulses $\overline{PWA}$ and $\overline{PWB}$ (see FIG. 13) having a fixed frequency and a variable pulse width, the pulse width being directly proportional to the input voltage at input terminal 82. The output pulses $\overline{PWA}$ and $\overline{PWB}$ are shown in FIG. 13 with 10% firing and with 50% firing. Pulses $\overline{PWA}$ and $\overline{PWB}$ are phase shifted by 180° from each other. FIG. 13 also shows the function (PWA+PWB) with 10% firing and 50% firing. The function (PWA+PWB) is utilized to chop the output of Rectifier 36 (FIG. 1) in Regulator Power Switch 32 as described hereinafter.

Figure 3:
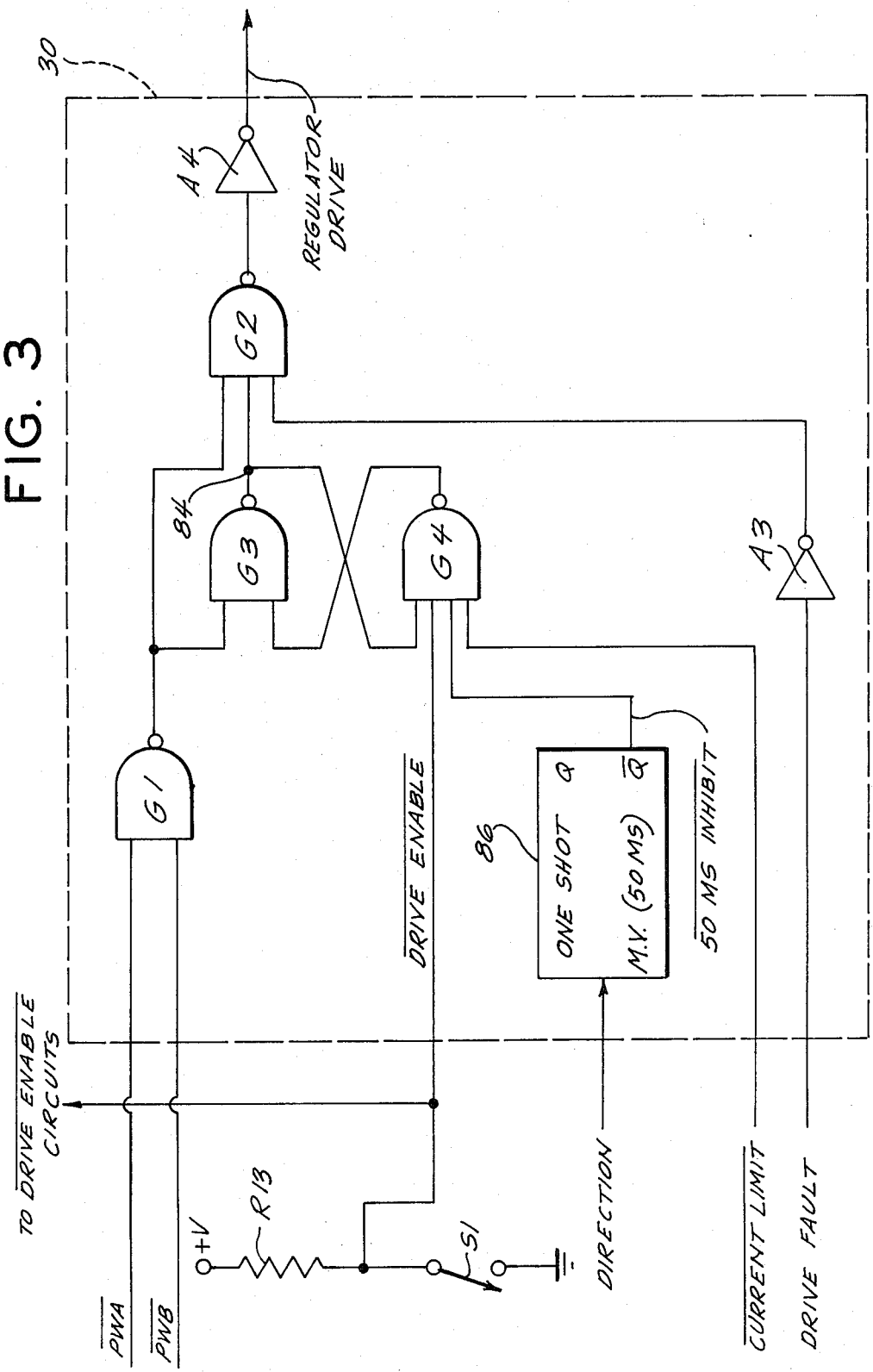
FIG. 3 is a detailed block diagram of one illustrative circuit for the current limit and interlock protection circuit of FIG. 1.

Output pulses $\overline{PWA}$ and $\overline{PWB}$ are applied to a NAND gate G1 (FIG. 3) in Current Limit and Interlock Protection Circuit 30 (FIGS. 1 and 3). The output of NAND gate G1 is (PWA+PWB), which is applied to one input of NAND gate G2 and to one input of NAND gate G3. NAND gate G3 is cross-coupled with NAND gate G4 to form a latch having an output terminal 84 which is coupled to one input of NAND gate G2. Normally, the above-noted latch is reset and the REGULATOR DRIVE output is only a function of (PWA+PWB). The latch is set if any of the following signals switch to the logic "0" state: $\overline{CURRENT\ LIMIT}$, $\overline{50\ MS\ INHIBIT}$ and $\overline{DRIVE\ ENABLE}$. $\overline{CURRENT\ LIMIT}$ switches to logic "0" when the current in the stator windings of motor 10 exceeds a predetermined limit, $\overline{50\ MS\ INHIBIT}$ switches to logic "0" for 50 milliseconds following a change in the DIRECTION signal input to one shot multi-vibrator 86, and $\overline{DRIVE\ ENABLE}$ switches to a logic "0" in response to a DISABLE DRIVE toggle switch S1, which can be manually actuated to disable the drive, or in response to any suitable electrical $\overline{DRIVE\ ENABLE}$ circuits. When any one of the above-noted inputs to gate G4 is at logic "0", the latch is set, which drives the output of gate G2 to a logic "1" thus disabling gate G2 and blocking (PWA+PWB). Gate G2 is also disabled when DRIVE FAULT switches to logic "1", which is inverted by amplifier A3 to provide a logic "0" input to gate G2. DRIVE FAULT switches to a logic "1" in response to an over-current condition, an over-voltage condition, or an under-voltage condition, as determined by Fault Monitor Circuit 66 (FIG. 1). The output of gate G2 is inverted by Amplifier A4 to produce a REGULATOR DRIVE output voltage which, when not inhibited, is a train of positive going pulses having a fixed frequency and a variable duty cycle which is proportional to the amplitude of the VELOCITY ERROR voltage. The REGULATOR DRIVE output is applied to Regulator Power Switch 32 (FIG. 1). The detailed schematic circuit for Regulator Power Switch 32 is shown in FIG. 10.

Figure 10:
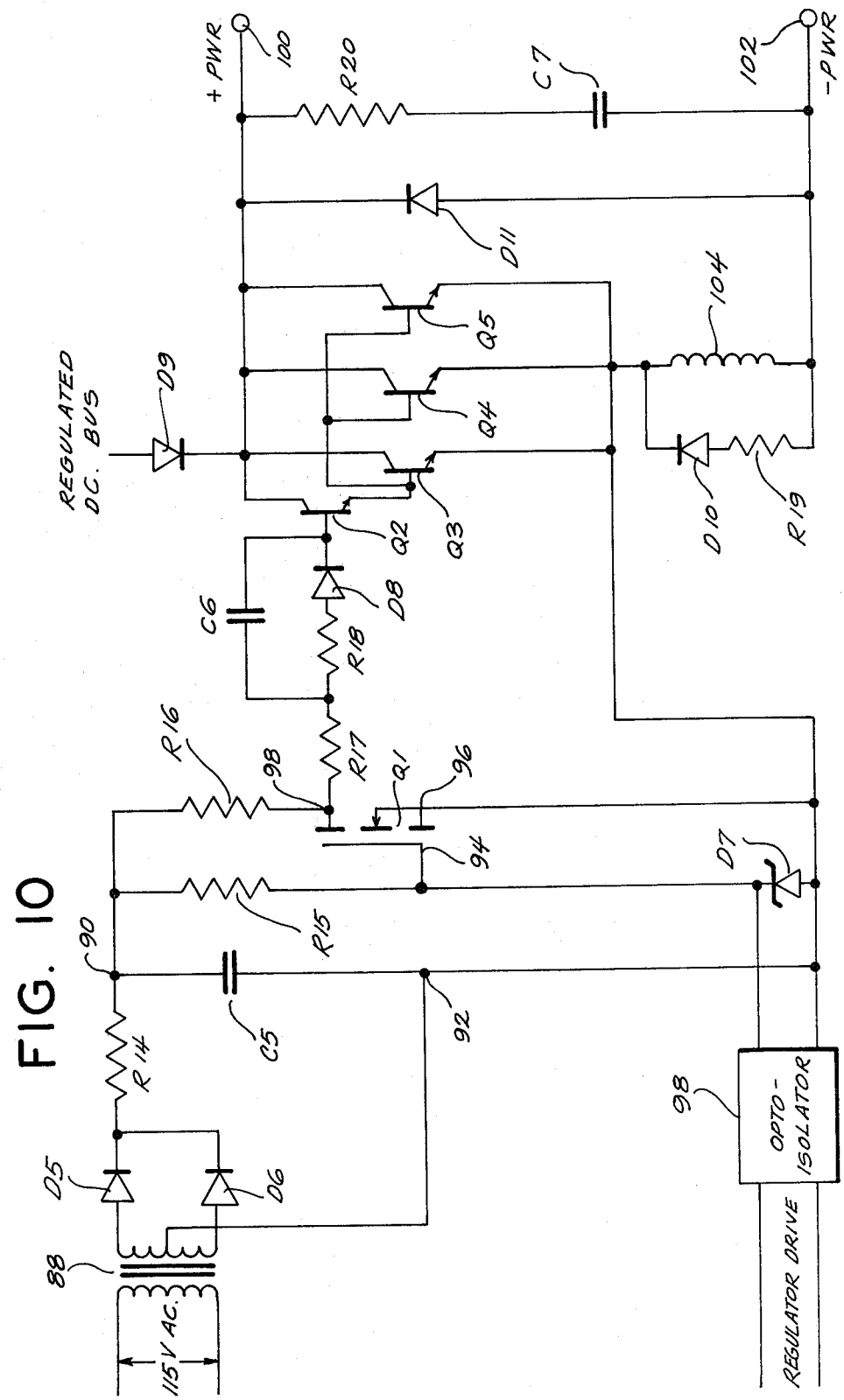
FIG. 10 is a schematic circuit diagram of one illustrative circuit for the regulator power switch of FIG. 1.

Referring to FIG. 10, the Regulator Power Switch circuits includes a floating bias power supply made up of a transformer 88, a pair of diodes D5 and D6, a resistor R14 and a filter capacitor C5. Diodes D5 and D6 are connected to form a full wave rectifier. The filtered output of diodes D5 and D6, which appears between terminals 90 and 92, is applied via resistor R15 and Zener diode D7 to the gate of field effect transistor Q1. The drain-source circuit of transistor Q1 is coupled across the filtered output of diodes D5 and D6 through load resistor R16. Resistor R15 and Zener diode D7 form a bias voltage divider which normally applies +12 VDC to the gate 94 of field effect transistor Q1, thereby turning transistor Q1 on and providing a low resistance circuit between the source 96 and drain 98 of transistor Q1. This effectively places drain 98 at ground potential.

The REGULATOR DRIVE input is applied to the input of an optical isolator 98 whose output is connected across Zener diode D7. In response to a positive REGULATOR DRIVE pulse at the input to optical isolator 98, the output thereof drops to a low value which effectively shorts diode D7 and switches Q1 off. This applies almost the full positive potential of the bias power supply to drain terminal 98. Thus a pulse train, which corresponds to the REGULATOR DRIVE, is formed at drain terminal 98. This pulse train is coupled via resistors R17 and R18 and diode D8 to the base of driver transistor Q2.

Resistors R17 and R18 are current limiting resistors and diode D8 protects transistor Q1 and the bias power supply from high voltage in case the base-collector junction of driver transistor Q2 should short out. A speed-up capacitor C6 is coupled in parallel with diode D8 and resistor R18 to enhance the turn-on and turn-off characteristics of the base drive signal applied to transistor Q2.

The collector of transistor Q2 is connected via diode D9 to a high voltage regulated DC bus and the emitter of transistor Q2 is connected in parallel to the bases of three parallel connected power transistors Q3, Q4 and Q5. The collectors of transistors Q3, Q4 and Q5 are connected in parallel to terminal 100 and to the cathode of diode D9. The emitters of transistors Q3, Q4 and Q5 are connected in parallel to terminal 102 through choke 104 which minimizes the generation of radio frequency interference. Choke 104 is clamped by diode D10 and resistor R19 to prevent destructive voltages from being generated by the choke during switch turn-off. The complete switching circuit is clamped by an RC snubber network which includes diode D11, resistor R20 and capacitor C7. The snubber network shapes the $I_c$ VS $V_{ce}$ load line of the power transistor stage during turn-off.

The output of the above-described Regulator Power Switch circuit appears at terminal 102 and is a high power D.C. pulse train having a fixed amplitude and frequency but having a variable duty cycle which corresponds to the duty cycle of the REGULATOR DRIVE input. Output terminal 102 is coupled to a conventional LC Filter Circuit 34 (FIG. 1) which filters the pulse train to produce a D.C. voltage having an amplitude which is proportional to the duty cycle of the REGULATOR DRIVE voltage which, in turn, is proportional to the VELOCITY ERROR voltage. The variable amplitude D.C. output voltage of LC Filter Circuit 34 is applied to an inverter circuit, described below, which changes the variable D.C. voltage into a variable amplitude A.C. voltage which is used to drive motor 10.

INVERTER CIRCUIT

Figure 5:
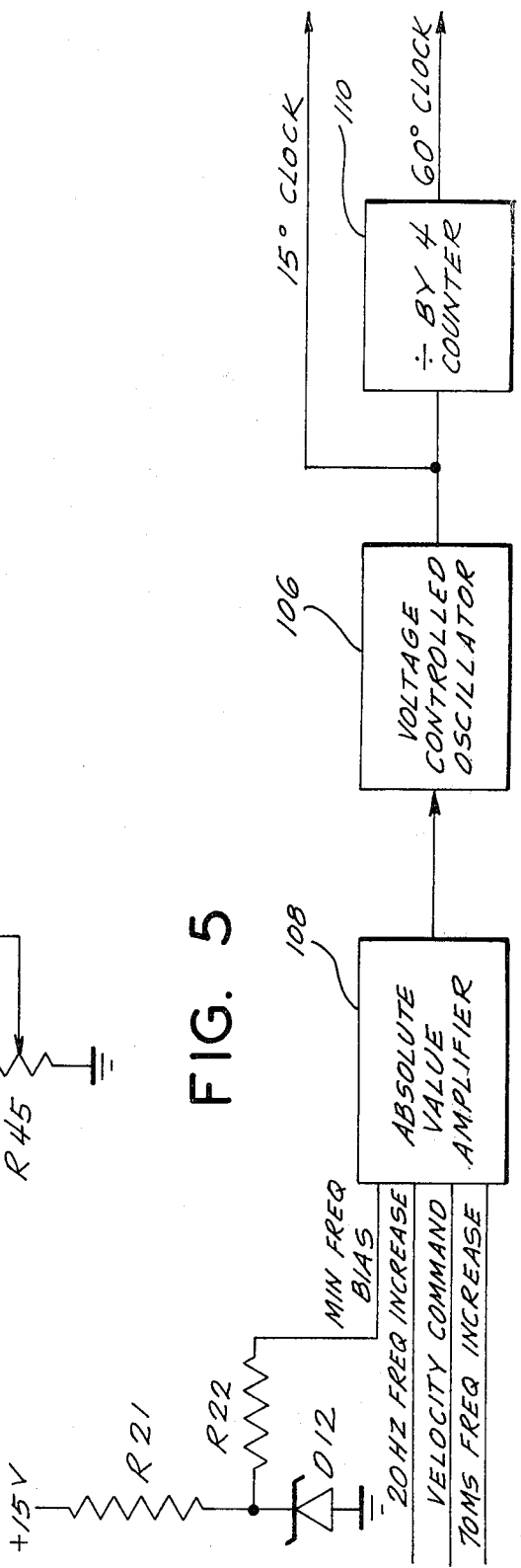
FIG. 5 is a detailed block diagram of one illustrative circuit for the voltage to frequency converter of FIG. 1.

The major components of the inverter circuit are Voltage to Frequency Converter Circuit 38 (FIG. 1), Three Phase Motor Drive Generator 40 and Inverter Power Switches 48 and 50. We will first describe the Voltage to Frequency Converter Circuit 38, which is shown in the block diagram of FIG. 5.

The heart of the Voltage to Frequency Converter Circuit 38 is a conventional voltage controlled oscillator 106 (FIG. 5) which produces a D.C. output pulse train having a frequency which is proportional to the magnitude of a D.C. input signal. The D.C. input signal to voltage controlled oscillator 106 is supplied by an absolute value amplifier 108 which can be the same circuit as shown in FIG. 2 and described above. Absolute value amplifier 108 receives four D.C. input signals, described in FIG. 5, adds the signals together and produces a D.C. output signal which is equal to a constant multiplied by the absolute value of the input signal sum. Since the detailed explanation of the input signals to absolute value amplifier 108 involves the overall operation of the motor, these input signals are described in later paragraphs which deal with the overall operation of the motor. For the moment, it will be assumed that the output of absolute value amplifier 108 is at its minimum level, which will produce an output frequency of 192 Hz for voltage controlled oscillator 106. The output signal of voltage controlled oscillator 106 is designated as the 15° CLOCK signal since each cycle of this output is 1/24th of a full output cycle of Three Phase Motor Drive Generator 40. The output of voltage controlled oscillator 106 is divided by four in a divide by four counter 110 whose output signal is designated as the 60° CLOCK. Each cycle of the 60° CLOCK signal is 1/6th of a full output cycle of Three Phase Motor Drive Generator 40. Both the 15° CLOCK signal and the 60° CLOCK signal are applied to Three Phase Motor Drive Generator 40, the inner circuits of which are shown in FIG. 9.

The heart of the Three Phase Motor Drive Generator circuit is a conventional 3-phase ring counter 112 (FIG. 9) which is clocked by the 60° CLOCK signal and produces six square wave outputs A, $\overline{A}$, B, $\overline{B}$, C and $\overline{C}$, as shown in the waveforms of FIG. 11, which shows the relationship of outputs A, $\overline{A}$, B, $\overline{B}$, C and $\overline{C}$ with respect to 15° CLOCK and 60° CLOCK signals. The outputs of ring counter 112 are applied to a set of latches 114 which are clocked by the 15° CLOCK. The output signals of latches 114 are applied to a set of NAND gates G5 through G10 which are enabled by a $\overline{\text{DRIVE FAULT}}$ signal applied thereto by amplifier A5. $\overline{\text{DRIVE FAULT}}$ is normally at logic "1" and switches to a logic "0" in response to an over-voltage condition, under-voltage condition, or over-current condition, as explained hereinafter. When $\overline{\text{DRIVE FAULT}}$ switches to a logic "0", all of the gates G5 through G10 are disabled. When gates G5 through G10 are enabled, their outputs PHASE A, $\overline{\text{PHASE A}}$, PHASE B, $\overline{\text{PHASE B}}$, PHASE C AND $\overline{\text{PHASE C}}$ relates, as shown in FIG. 11, to the 15° CLOCK, 60° CLOCK and ring counter outputs A, $\overline{A}$, B, $\overline{B}$, C and $\overline{C}$ described above. It should be noted that the transition of each PHASE signal from logic "1" to logic "0" or vice versa is displaced by 15° of phase angle from the corresponding transition of the inverse PHASE signal. For example, PHASE A goes from logic "1" to logic "0" 15° before $\overline{\text{PHASE A}}$ goes from logic "0" to logic "1". This is due to the clocking of output latches 114 (FIG. 9) by the 15° CLOCK signal and prevents an inadvertent shorting of the output voltage due to PHASE A and $\overline{\text{PHASE A}}$ being in the logic "1" state at the same time. This 15° offset is also true for PHASE B, $\overline{\text{PHASE B}}$, PHASE C and $\overline{\text{PHASE C}}$ as can be seen in FIG. 11.

Figure 9:
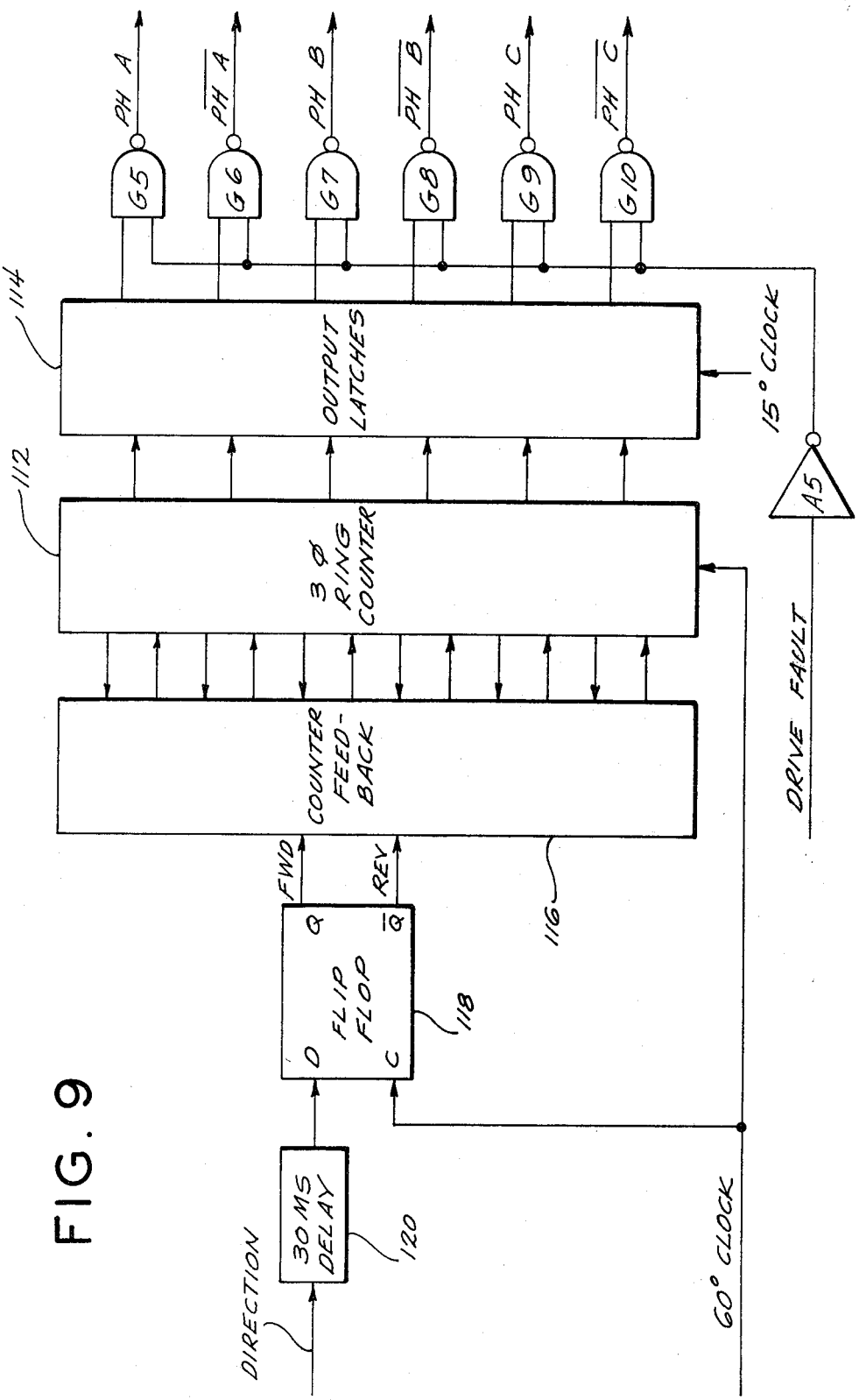
FIG. 9 is a detailed block diagram of one illustrative circuit for the 3-phase motor drive generator of FIG. 1.

Three phase ring counter 112 is reversible and can be caused to count either forward or reverse due to conventional gates in a counter feedback circuit 116 (FIG. 9). The feedback gates in counter feedback circuit 116 are switched between the forward and reverse direction by a direction flip-flop 118. The forward and reverse counting sequences are shown in the waveforms of FIG. 12 and are specified in Chart I below.

CHART I

|  | STEP | OUTPUTS |
|---|---|---|
| FORWARD | 1. | $A\overline{BC}$ |
|  | 2. | $AB\overline{C}$ |
|  | 3. | $\overline{A}B\overline{C}$ |
|  | 4. | $\overline{A}BC$ |
|  | 5. | $\overline{AB}C$ |
|  | 6. | $A\overline{B}C$ |
| REVERSE | 1. | $A\overline{B}C$ |
|  | 2. | $\overline{AB}C$ |
|  | 3. | $\overline{A}BC$ |
|  | 4. | $\overline{A}B\overline{C}$ |
|  | 5. | $AB\overline{C}$ |
|  | 6. | $A\overline{BC}$ |

Figure 12:
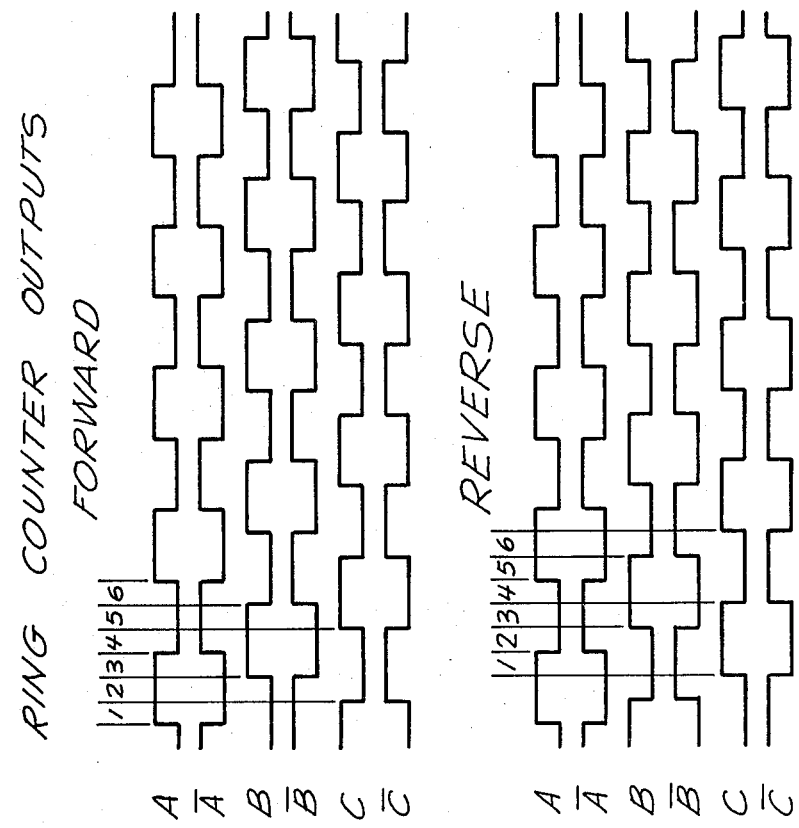
FIG. 12 is a set of waveforms illustrating the forward and reverse counting directions for the motor drive generator of FIG. 1.

Each step in Chart I is identified by number in the waveforms of FIG. 12.

The direction of counting for 3-phase ring counter 112 is reversed 30 milliseconds after the state of the DIRECTION signal changes. The delay is provided by 30 ms delay circuit 120. The DIRECTION signal is derived from the VELOCITY ERROR signal by an overdriven amplifier circuit 42 (FIG. 1). Thus, the state of the DIRECTION signal changes every time the polarity of the VELOCITY ERROR changes. The VELOCITY ERROR signal changes polarity whenever the actual speed of motor 10 exceeds the commanded speed thereof. Thus, the above-described reversal of 3-phase ring counter 112 causes deceleration of motor 10 to occur in the plugging mode, i.e., in the mode where the magnetic field caused by the stator excitation is rotating in the opposite direction of the motor rotation. Deceleration in the plugging mode is extremely efficient and fast in this design compared to deceleration in the regenerative mode, i.e., in the mode where the magnetic field caused by the stator excitation is rotating in the same direction as the motor rotation. In this embodiment, plugging occurs at a very low stator frequency of 8 Hz.

The above described 3-phase voltage waveforms A, $\overline{A}$, B, $\overline{B}$, C and $\overline{C}$ are applied to the inverter power switches 48 and 50 (FIG. 1) to generate the stator excitation for motor 10. Each of the inverter power switches 48 and 50 contains three of the driver circuits shown in FIG. 10 and described previously in connection with Regulator Power Switch 32. The R.F. choke 104 is, however, omitted in the inverter power switch. In FIG. 1, each of the above-noted driver circuits is symbolized by one of the transistors 52 through 62 in inverter power switches 48 and 50. The emitter-collector circuits for each of transistors 52 through 62 is shown in FIG. 1, but the base circuits are omitted. It will be understood by those skilled in the art that each base circuit is driven by a corresponding one of the 3-phase signals A, $\overline{A}$, B, $\overline{B}$, C and $\overline{C}$. Transistor 52 is driven by signal A, transistor 58 is driven by signal $\overline{A}$, transistor 54 is driven by signal B, transistor 60 is driven by signal $\overline{B}$, transistor 56 is driven by signal C, and transistor 62 is driven by signal $\overline{C}$. The transistors 52 through 62 are connected as shown in FIG. 1 to the stator windings 13, 15 and 17 of motor 10 through a conventional motor contactor 64 and causes the rotor of motor 10 to rotate when contactor 64 is switched on and a VELOCITY COMMAND is present in numerical control circuits 24. Both the frequency and the amplitude of the stator excitation are variable and are varied as described below to achieve optimum operation of motor 10.

OPERATION OF THE MOTOR

Motor contactor 64 (FIG. 1) is turned on when the entire circuit is activated, but initially, there will be no stator excitation in motor 10 due to the fact that the VELOCITY ERROR signal is initially zero, which means that the output of Regulator Power Switch 32 will be zero. There will be 3-phase excitation signals applied to the bases of transistors 52 through 62 (FIG. 1) but there will be no collector voltage on the collectors of transistors 52, 54 and 56. Thus, the rotor of motor 10 will be stationary until a VELOCITY COMMAND signal is received at the input to Velocity Error Amplifiers 22 (FIG. 1).

The VELOCITY COMMAND signal is an analog voltage whose amplitude signifies a desired motor speed and whose polarity indicates the desired direction of rotation. The VELOCITY COMMAND signal is derived in numerical control circuits 24 (FIG. 1) from a digital number on punched tape 26. When the VELOCITY COMMAND signal is initially applied to Velocity Error Amplifiers 22, the VELOCITY ERROR signal will initially be high since there is initially no output from tachometer 18. Therefore, Regulator Power Switch 32 will provide an output voltage which is applied to the collectors of transistors 52, 54 and 56 and will energize the stator windings of motor 10 and will start the rotor rotating. At speeds under a predetermined level, in this case 150 RPM, the frequency of the stator excitation signal is held at a minimum value which, in this case, is 28 Hz. This is accomplished by providing a 20 Hz FREQUENCY INCREASE signal from Speed Measuring Circuit 46 (FIG. 1) and applying this signal to the input of absolute value amplifier 108 (FIG. 5) along with a MIN FREQUENCY BIAS derived from a voltage divider formed by resistor R21 and Zener diode D12 through resistor R22. The MIN FREQUENCY BIAS has a value equal to 8 Hz of the stator field and is added to the 20 Hz INCREASE signal to give a total of 28 Hz for the stator field frequency at rotor speeds under 150 RPM. This provides smooth operation of the motor with no cogging effects down to zero speed.

Figure 8:
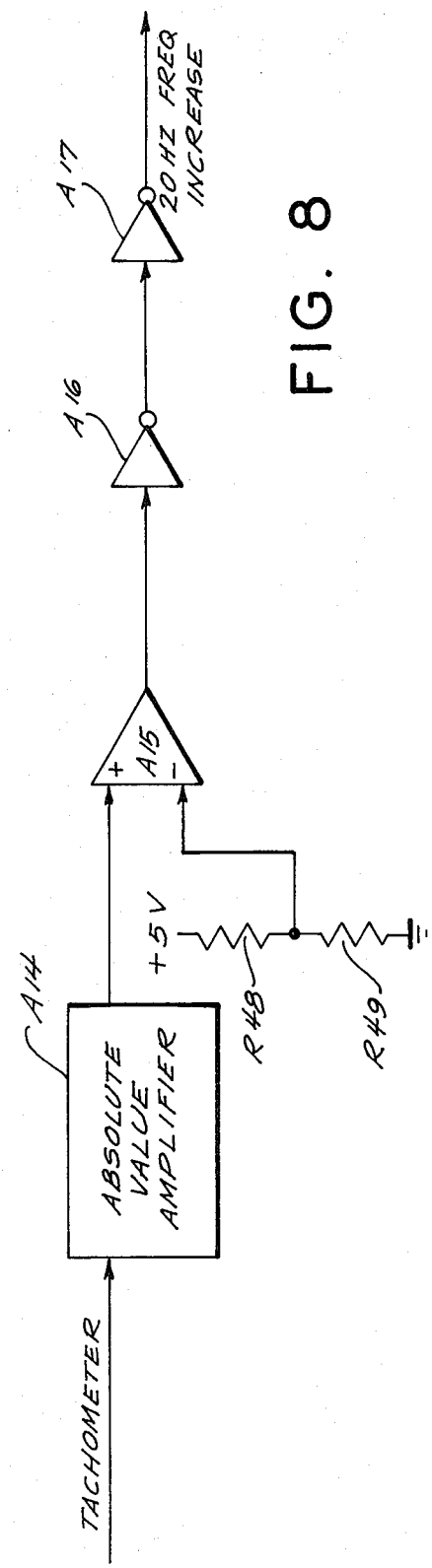
FIG. 8 is a detailed block diagram of one illustrative circuit for the speed measuring circuit of FIG. 1.

The 20 Hz INCREASE signal is derived from the output of tachometer 18 in a speed measuring circuit 46, the details of which are shown in FIG. 8. The tachometer output is applied to an absolue value amplifier A14 which can be the same circuit as shown in FIG. 2. The output of amplifier A14 is coupled to the positive input terminal of an analog comparator A15 whose negative input terminal is coupled to reference voltage divider resistors R48 and R49. R48 and R49 are sized to cut off comparator A15 when the motor speed reaches 150 RPM. The output of comparator A15 is amplified by two inverters A16 and A17, the output of which constitutes the 20 Hz FREQUENCY INCREASE signal.

When the motor speed reaches 150 RPM, the 20 Hz INCREASE signal switches to zero and the stator frequency drops to the minimum frequency of 8 Hz. Thereafter, the VELOCITY COMMAND signal, which is applied to the input of absolute value amplifier 108, causes the stator frequency to increase linearly in accordance with the magnitude of the VELOCITY COMMAND up to a maximum of 110 Hz for this particular embodiment of the invention. Higher or lower maximum speed limits may be employed in other embodiments of the invention.

As the motor 10 approaches its commanded speed, the amplitude of the stator field excitation drops to a low level due to the drop in the VELOCITY ERROR signal. The speed will stabilize near the commanded speed with a slip that is dependent on the load on the rotor.

When motor 10 is to be stopped, the VELOCITY COMMAND voltage is dropped to zero, which changes the sign of the VELOCITY ERROR voltage, and thus, changes the state of the DIRECTION signal output from Direction Amplifier 42 (FIG. 1). The change in the state of the DIRECTION signal triggers a 50 m.s. delay one-shot multivibrator 86 (FIG. 3) which disables G2 and blocks the REGULATOR DRIVE input to Regulator Power Switch 32 and drops the stator excitation voltage to zero. After a 30 m.s. delay induced by delay circuit 120 (FIG. 9), direction flip-flop 118 is triggered to reverse the direction of the stator excitation field. This occurs during the 50 m.s. period in which the stator excitation voltage is zero. The change in the DIRECTION signal also triggers a 70 m.s. one-shot multivibrator 44 (FIG. 1) which applies a maximum frequency bias to Absolute Value Amplifier 108 (FIG. 5) to raise the stator excitation frequency to its maximum value to speed up the motor stopping action. After the 70 m.s. period, the stator excitation frequency drops to 8 Hz. As the rotor comes to a stop, the VELOCITY ERROR drops to zero, and thus, the stator excitation voltage drops to zero.

Deceleration of the motor is triggered when the VELOCITY COMMAND voltage drops below the tachometer voltage, which changes the state of the DIRECTION signal and induces the same action as described above for stopping. Thus, deceleration is also carried out in the plugging mode.

The motor can also be operated in a positioning mode by examining the output of resolver 20 in the N.C. circuits and generating a POSITION signal having an amplitude which is proportional to the difference between the actual position of the rotor and the desired position thereof and having a polarity which indicates the direction of rotation for the rotor. This POSITION signal is applied to Velocity Error Amplifiers 22 (FIG. 1) in place of the VELOCITY COMMAND. The circuits for generating the POSITION signal are conventional, and hence, are not disclosed in detail herein.

FAULT MONITOR CIRCUIT

Figure 6:
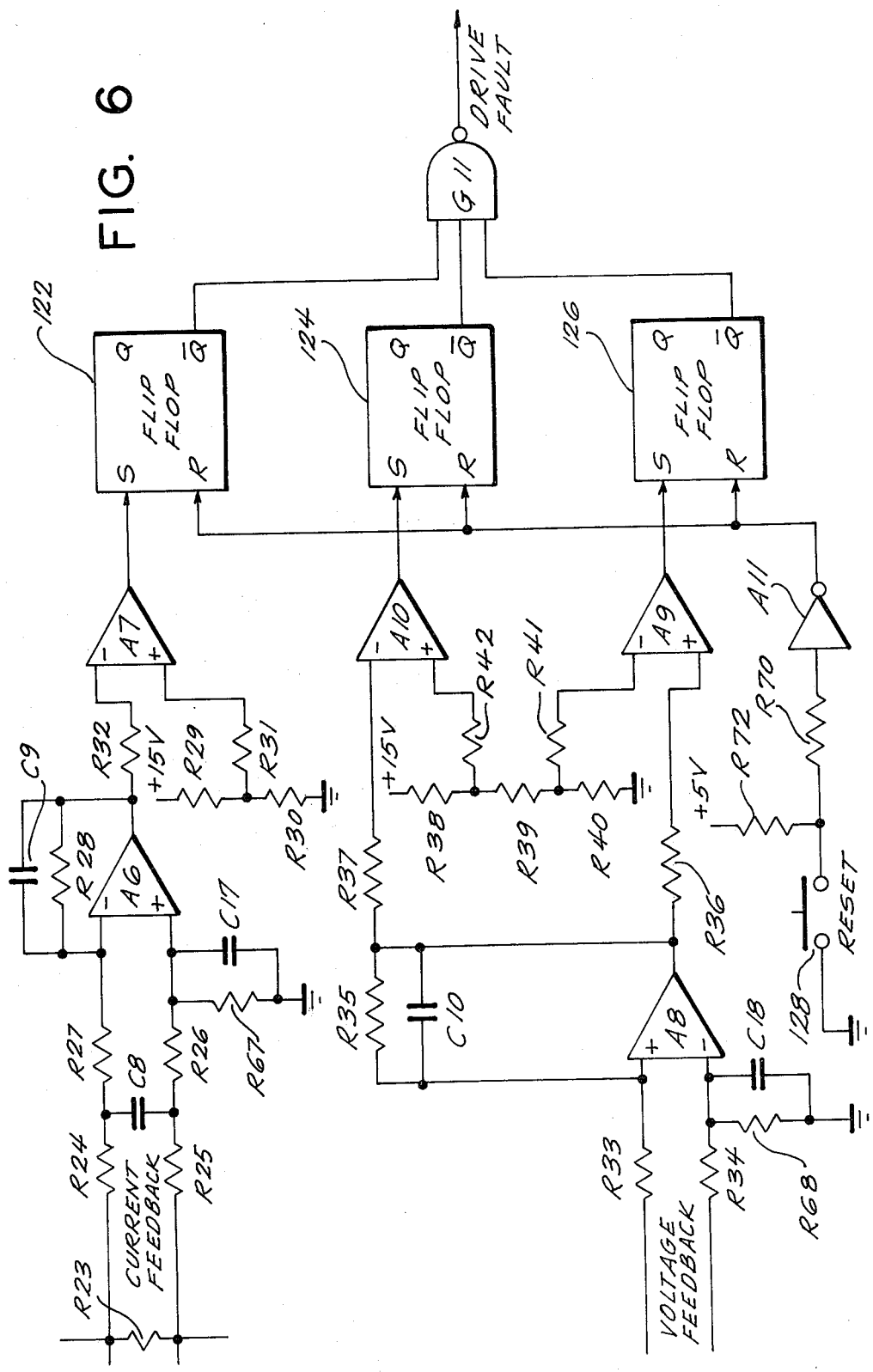
FIG. 6 is a schematic circuit diagram of one illustrative circuit for the fault monitor of FIG. 1.

The details of the fault monitor circuit are shown in FIG. 6. The fault monitor circuit produces an output signal in response to an over-current condition, an over-voltage condition, or an under-voltage condition. Referring to FIG. 6, CURRENT FEEDBACK voltage from a small (0.01Ω) resistor R23 in the motor stator winding circuit is applied to operational amplifier A6 through a filter network comprising resistors R24 and R25 and capacitor C8. R26 and R27 are input resistors which, along with resistors R28 and R67, determine the gain of the amplifier A6. Capacitors C9 and C17 are bypass capacitors.

The output of amplifier A6 is applied through resistor R32 to the negative input of another comparator A7 whose positive input is connected to a reference voltage network comprising resistors R29 and R30. R31 is a current limiting resistor. Amplifier A7 acts as a differential amplifier which amplifies the difference between its two inputs. When the current through R23 rises above a predetermined overcurrent level, the output of amplifier A7 will set an overcurrent flip-flop 122. The $\overline{Q}$ output of flip-flop 122 is applied to one input of a NAND gate G11 whose output constitutes the DRIVE FAULT signal. When any one of the inputs of gate G11 switches to a logic "0", its output switches to a logic "1". The VOLTAGE FEEDBACK, which is taken from the unregulated d.c. bus, is applied through resistors R33 and R34 to the negative and positive terminals, respectively, of operational amplifier A8. The gain of amplifier A8 is determined by resistors R33, R35, R34 and R68. Capacitors C10 and C18 are filter capacitors. The output of amplifier A8 is applied through resistor R36 to the positive input terminal of comparator A9 and through resistor R37 to the negative input terminal of comparator A10. The other input terminals of comparators A9 and A10 receive reference voltages from voltage divider resistor networks R38, R39 and R40 through resistors R41 and R42, respectively. The output of comparator A10 is coupled to the set terminal of a flip-flop 124 and the output of comparator A9 is coupled to the set terminal of a flip-flop 126. The $\overline{Q}$ output of both flip-flops 124 and 126 is coupled to the input of gate G11. Amplifier A9 sets flip-flop 126 when the VOLTAGE FEEDBACK falls below a predetermined reference level and amplifier A10 sets flip-flop 124 when the VOLTAGE FEEDBACK rises above a predetermined reference level. Both reference levels are determined by voltage divider resistors R38, R39 and R40.

After any one of the flip-flops 122, 124 or 126 has been set, it is reset manually by a pushbutton switch 128 which grounds the input of inverter A11 through resistor R70 and thereby places a logic "1" on the reset terminals of flip-flops 122, 124 and 126.

Figure 4:
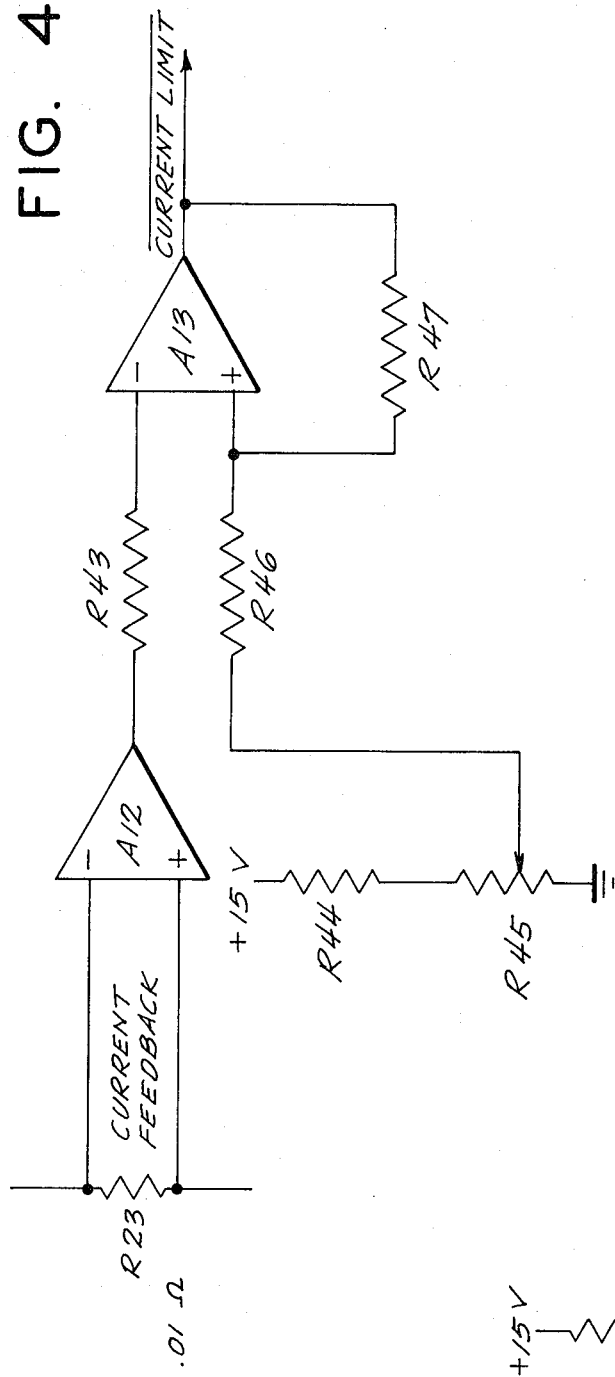
FIG. 4 is a schematic circuit diagram of one illustrative circuit for the current feedback processing circuit of FIG. 1.

Primary over-current protection is provided by current feedback processing circuit 68, the details of which are shown in FIG. 4. CURRENT FEEDBACK is provided by the same resistor R23 that provided CURRENT FEEDBACK for Fault Monitor Circuit 66. The voltage across resistor R23 is applied between the positive and negative input terminals of an operational amplifier A12 whose output is applied through resistor R43 to the negative input terminal of comparator A13. A reference voltage level, which is set by voltage divider resistors R44 and R45, is applied through resistor R46 to the positive input of comparator A13. The output of amplifier A13 is a $\overline{\text{CURRENT LIMIT}}$ signal which is applied to gate G4 (FIG. 3) to disable the REGULATOR DRIVE when the stator current rises above a predetermined level.

REGENERATIVE LOAD CIRCUIT

Figure 7:
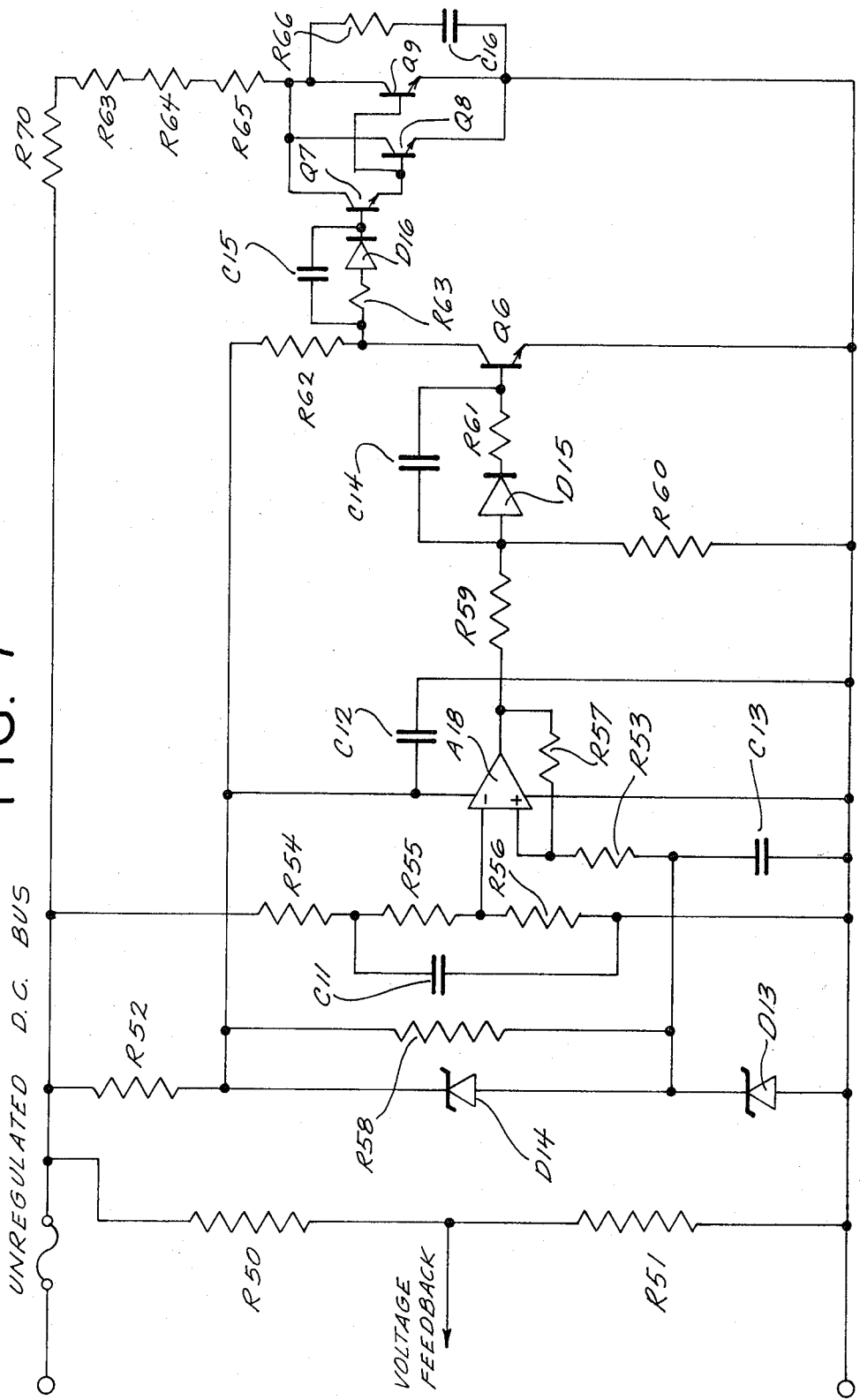
FIG. 7 is a schematic circuit diagram of one illustrative circuit for the regenerative load circuit of FIG. 1.

FIG. 7 shows the details of Regenerative Load Circuit 70. Referring to FIG. 7, resistors R50 and R51 form a voltage divider for the VOLTAGE FEEDBACK input to Fault Monitor Circuit 66. Zener diodes D13 and D14, along with resistors R52 and R58, form a voltage divider for providing a reference voltage level and a power supply voltage for comparator A18 and switching transistor Q6. The comparator is operational amplifier A18 which receives a reference voltage input from the junction of Zener diodes D13 and D14 via input resistor R53. The other input terminal of amplifier A18 is coupled to the unregulated d.c. bus through voltage divider resistors R54, R55 and R56. Capacitor C11 provides a high frequency bypass to the negative input of amplifier A18 to prevent the comparator from responding to transient voltage spikes. Capacitors C12 and C13 are filter capacitors. Resistor R57 provides hysteresis in the comparator circuit.

Under normal conditions, the positive input to amplifier A18 will be greater in magnitude than the negative input from the unregulated d.c. bus. The output of amplifier A18 will then be a logic "1". When the input from the unregulated d.c. bus becomes greater in magnitude than the reference input, indicating that the unregulated d.c. bus has exceeded a predetermined voltage level, the output of amplifier A18 will switch to a logic "0".

The output of amplifier A18 is coupled via resistors R59, R60, R61 and diode D15 to the base of switching transistor Q6. Capacitor C14 is a speed-up capacitor for the input signal to transistor Q6. Resistor R62 is the load resistor for transistor Q6. The output of transistor Q6 is coupled via resistor R63 and diode D16 to the base of switching transistor Q7. Diode D16 protects Q6 and the bias power supply from high voltage due to a short between the base and collector of transistor Q7. Capacitor C15 is a speed-up capacitor for the input signal to transistor Q7.

The emitter-collector circuit of transistor Q7 is coupled between the collectors and bases of two parallel connected power transistors Q8 and Q9 whose emitter-collector circuits are coupled in series with Regenerative Load Resistors R63, R64, R65 and R70. Power transistors Q8 and Q9 are normally biased to cut off but are switched to their conducting state to pass current through Regenerative Load Resistors R63, R64, R65 and R70 when the unregulated d.c. bus rises above a predetermined voltage level which switches the output of amplifier A18 to the logic "0" state. Resistor R66 and capacitor C16 form a snubber circuit which shapes the $I_c$ VS $V_{ce}$ line of power transistors Q8 and Q9 during turn off.

Although the illustrative embodiment of the invention has been described in considerable detail for the purpose of disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of the invention having now been fully explained in connection with the foregoing, we hereby claim as our invention:

1. An a.c. motor control circuit comprising:
   an a.c. motor having a plurality of stator windings and a rotor;
   a tachometer coupled to said rotor and operable to produce an output signal proportional to the speed of said rotor;
   means for generating a velocity command signal having an amplitude proportional to a desired speed for said motor;
   means for comparing the output signal of said tachometer to said velocity command signal and for generating an error signal proportional to the difference between said tachometer output signal and said velocity command signal;
   a d.c. power source;
   a first switching circuit coupled to the output of said d.c. power source;
   modulator means coupled to said first switching circuit and responsive to said error signal for periodically opening and closing said first switching circuit to cause said first switching circuit to produce a train of d.c. pulses having a substantially fixed frequency and having a variable pulse width which is proportional at any time to the amplitude of said error signal;
   a filter coupled to the output of said first switching circuit for filtering said train of d.c. pulses to produce a d.c. voltage which is substantially proportional to the amplitude of said error signal;
   an inverter coupled between the output of said filter and the stator windings of said motor, said inverter being operative to change said d.c. voltage into an a.c. voltage of variable frequency to drive said motor, said inverter including a variable frequency oscillator responsive to said velocity command signal for controlling the frequency of said a.c. voltage in accordance with said velocity signal.

2. An a.c. motor control circuit according to claim 1 wherein said inverter comprises:
   a second switching circuit coupled between the output of said filter and said stator windings, said second switching circuit including a plurality of electronic switches which can be opened and closed by electrical control signals;
   a first counter circuit having an input and having an output coupled to said electronic switches to render such electronic switches conductive in such manner as to cause an a.c. voltage to be applied to said stator windings, the output of said oscillator being coupled to the input of said counter to cause the counter to step through its counting cycle;
   a switchable feedback circuit coupled to said counter, said feedback circuit having a first state in which said counter is caused to count in the forward direction and having a second state in which said counter is caused to count in the reverse direction; and
   means for switching said feedback circuit between its first and second states in response to the polarity of said error signal to cause deceleration of said motor to occur in a plugging mode.

3. An a.c. motor control circuit according to claim 2 and further comprising:
   means responsive to said error signal for disconnecting said modulator means from said first switching circuit to disable it for a predetermined time interval following a change in the polarity of said error signal; and
   delay means coupled between said means for generating a velocity command signal and said means for switching said feedback circuit between its first and second states, for adlaying the transmission of an input signal to said means for switching said feedback circuit by an interval shorter in duration than said predetermined time interval so that said counter changes its direction of counting in response to a change in the polarity of said error signal within said predetermined time interval in which said modulator is disabled.

4. An a.c. motor control circuit according to claim 2 wherein said counter is a ring counter and wherein said means for switching said feedback circuit between its first and second states comprises a flip-flop, the output of said flip-flop being coupled to said feedback circuit and said flip-flop being responsive to said error signal to change the state of said flip-flop when the polarity of said error signal changes.

5. An a.c. motor control circuit according to claim 3 in which said oscillator is a voltage controlled oscillator, responsive to said velocity command signal; and,
   further comprising means coupled to the control input of said voltage controlled oscillator for increasing the frequency of said voltage controlled oscillator for a predetermined time interval following a change of polarity of said error signal to help decelerate the rotor of said motor.

6. An a.c. motor control circuit according to claim 2 and also comprising:
   a plurality of latches coupled between the output of said counter and said switching circuit; and
   means coupling the output of said oscillator to the clock input of said latches.

7. An a.c. motor control circuit according to claim 2 and also comprising means for holding the frequency of said oscillator above a minimum value when the speed of said rotor is below a predetermined level.

8. An a.c. motor control circuit according to claim 7 and also comprising means for varying the frequency of said oscillator in response to changes in the speed of said rotor above said predtermined level thereof.

9. An a.c. motor control circuit according to claim 7 wherein said oscillator is a voltage controlled oscillator and wherein said means for holding the frequency of said oscillator above a minimum value when the speed of said rotor is below a predetermined level comprises:
   means for applying a constant bias to the input of said voltage controlled oscillator when the speed of said rotor is below said predetermined level; and
   removing the bias when the speed of said rotor rises above said predetermined level.

10. An a.c. motor control circuit according to claim 9 wherein said velocity command signal is supplied to the input of said voltage controlled oscillator to cause the frequency thereof to vary in accordance with the speed of said rotor.

11. An a.c. motor control circuit according to claim 9 wherein said means for applying a constant bias to the input of said voltage controlled oscillator comprises:
an absolute value amplifier, the output voltage of said tachometer being coupled to the input of said absolute value amplifier;
a differential amplifier having a positive and a negative input and operable to produce an output proportional to the difference between said positive and negative inputs, the output of said absolute value amplifier being coupled to one input of said differential amplifier;
a reference voltage coupled to the other input of said differential amplifier; and
the output of said differential amplifier being coupled to the input of said voltage controlled oscillator.

12. An a.c. motor control circuit according to claim 9 and also comprising:
a one-shot multivibrator responsive to the polarity of said error signal and triggering when said velocity error signal changes polarity; and
the output of said one-shot multivibrator being coupled to the input of said voltage controlled oscillator to increase the frequency of said oscillator for a predetermined time interval following a change in the polarity of said velocity error signal.

13. An a.c. motor control circuit according to claim 6 and also comprising a second counter, the input of said second counter being coupled to the output of said oscillator, and the output of said second counter being coupled to the input of said first counter.

14. An a.c. motor control circuit according to claim 1 and further comprising:
a gating circuit coupled between said modulator and said first switching circuit; and
including means for disabling said gating circuit when the current flow in said stator windings exceeds a predetermined level.

15. An a.c. motor control circuit according to claim 14 and further comprising means for disabling said gating circuit for a predetermined time interval following a change in the polarity of said error signal.

16. An a.c. motor control circuit according to claim 15 wherein said means for disabling said gating circuit comprises:
a one-shot multivibrator responsive to the polarity of said velocity error signal and triggering when said error signal changes polarity; and
the output of said one-shot multivibrator being coupled to said gating circuit to disable said gating circuit when said one-shot multivibrator triggered.

* * * * *